US011438966B2

(12) United States Patent
Seo et al.

(10) Patent No.: US 11,438,966 B2
(45) Date of Patent: Sep. 6, 2022

(54) ELECTRONIC DEVICE FOR PROVIDING WI-FI COMMUNICATION AND MOBILE HOTSPOT COMMUNICATION AND METHOD THEREOF

(71) Applicant: SAMSUNG ELECTRONICS CO., LTD., Suwon-si (KR)

(72) Inventors: Jungkuk Seo, Suwon-si (KR); Seungjae Lee, Suwon-si (KR); Sungjun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/047,180

(22) PCT Filed: Mar. 18, 2019

(86) PCT No.: PCT/KR2019/003084
§ 371 (c)(1),
(2) Date: Oct. 13, 2020

(87) PCT Pub. No.: WO2019/208930
PCT Pub. Date: Oct. 31, 2019

(65) Prior Publication Data
US 2021/0153294 A1    May 20, 2021

(30) Foreign Application Priority Data
Apr. 26, 2018  (KR) .................. 10-2018-0048612

(51) Int. Cl.
H04W 4/00    (2018.01)
H04W 88/06   (2009.01)
(Continued)

(52) U.S. Cl.
CPC ............ *H04W 88/06* (2013.01); *H04W 4/80* (2018.02); *H04W 48/16* (2013.01); *H04W 76/14* (2018.02); *H04W 76/23* (2018.02); *H04W 76/38* (2018.02)

(58) Field of Classification Search
CPC ....... H04W 88/06; H04W 4/80; H04W 48/16; H04W 76/23; H04W 76/14
(Continued)

(56) References Cited

U.S. PATENT DOCUMENTS 9,037,123 B2   5/2015  Malmbak et al.
9,585,143 B2   2/2017  Tang et al.
(Continued)

FOREIGN PATENT DOCUMENTS

CN       106535288         3/2017
KR    10-2017-0130511     11/2017
WO       2017/086656       5/2017

OTHER PUBLICATIONS

International Search Report for PCT/KR2019/003084, dated Jul. 10, 2019, 4 pages.
(Continued)

*Primary Examiner* — Marceau Milord
(74) *Attorney, Agent, or Firm* — Nixon & Vanderhye, P.C.

(57) ABSTRACT

An electronic device is disclosed. In addition, various embodiments recognized through the specification are possible. The electronic device includes a housing, at least one antenna located in the housing, a Wi-Fi module that is electrically connected with the at least one antenna, supports a Wi-Fi protocol, and includes one core, a processor that is located in the housing and is operatively connected with the Wi-Fi module, and a memory operatively connected with the processor. The memory stores instructions, when executed, (Continued)

causing the processor to establish a Wi-Fi link on a first channel with an access point (AP), through the Wi-Fi module, establish a mobile hotspot link on the first channel with an external electronic device, through the Wi-Fi module, detect an event associated with a change in state of the Wi-Fi link, and change a state of the mobile hotspot link, based at least on the detected event.

13 Claims, 11 Drawing Sheets

(51) Int. Cl.
    *H04W 76/23*     (2018.01)
    *H04W 76/38*     (2018.01)
    *H04W 76/14*     (2018.01)
    *H04W 4/80*     (2018.01)
    *H04W 48/16*     (2009.01)

(58) Field of Classification Search
    USPC .......................................................... 370/329
    See application file for complete search history.

(56) References Cited

U.S. PATENT DOCUMENTS

| | | | |
|---|---|---|---|
| 9,622,089 B1 | 4/2017 | Ngo et al. | |
| 9,736,639 B2* | 8/2017 | Saari .................... | H04W 4/029 |
| 9,769,721 B2* | 9/2017 | Zhang .................. | H04W 36/06 |
| 9,775,103 B2* | 9/2017 | Chang .................. | H04W 48/16 |
| 10,015,732 B2* | 7/2018 | Chang .................. | H04W 48/16 |
| 10,506,484 B2 | 12/2019 | Richards et al. | |
| 10,560,971 B2 | 2/2020 | Seo et al. | |
| 10,595,266 B2 | 3/2020 | Liu et al. | |
| 2011/0210820 A1* | 9/2011 | Talty .................... | H04W 12/06 340/5.8 |
| 2014/0128001 A1* | 5/2014 | Imes ........................ | G05F 1/66 455/41.2 |
| 2014/0323049 A1* | 10/2014 | Park ...................... | H04W 4/80 455/41.2 |
| 2014/0355527 A1* | 12/2014 | Vaidya ................. | H04W 76/15 370/329 |
| 2014/0379883 A1* | 12/2014 | Filgueiras .............. | H04W 4/50 709/223 |
| 2015/0049681 A1* | 2/2015 | Huang ............... | H04W 72/1289 370/329 |
| 2015/0098430 A1* | 4/2015 | Zhang .................. | H04W 36/06 370/329 |
| 2015/0103680 A1* | 4/2015 | Anand ............. | H04W 72/0446 370/252 |
| 2015/0271340 A1* | 9/2015 | Yu .......................... | H04W 4/16 455/417 |
| 2016/0037542 A1* | 2/2016 | Tang ..................... | H04W 72/10 370/329 |
| 2016/0105924 A1* | 4/2016 | Baek ..................... | H04W 84/18 455/41.2 |
| 2016/0112839 A1* | 4/2016 | Choi ....................... | H04W 4/80 455/41.2 |
| 2016/0127559 A1* | 5/2016 | Baek ..................... | H04M 3/543 455/417 |
| 2016/0197987 A1* | 7/2016 | Lee ......................... | H04W 4/38 709/204 |
| 2016/0198342 A1* | 7/2016 | Kim ........................ | H04L 63/18 455/411 |
| 2017/0064595 A1* | 3/2017 | Chang .................. | H04W 48/16 |
| 2017/0086204 A1* | 3/2017 | Jung ................. | H04W 28/0263 |
| 2017/0105222 A1* | 4/2017 | Nieman ................ | H04W 72/02 |
| 2017/0111854 A1* | 4/2017 | Ho ......................... | H04W 36/22 |
| 2017/0181002 A1 | 6/2017 | Ngo et al. | |
| 2017/0196034 A1* | 7/2017 | Jung ..................... | H04W 76/23 |
| 2017/0251515 A1* | 8/2017 | Altman ............... | H04L 61/2503 |
| 2017/0325158 A1 | 11/2017 | Phogat et al. | |
| 2017/0353916 A1* | 12/2017 | Chang .................. | H04W 48/16 |
| 2018/0014341 A1* | 1/2018 | Jung ..................... | H04W 8/005 |
| 2018/0199265 A1* | 7/2018 | Liu ....................... | H04W 48/08 |
| 2020/0077316 A1 | 3/2020 | Richards et al. | |
| 2021/0127262 A1* | 4/2021 | Park ........................ | H04W 4/80 |

OTHER PUBLICATIONS

Written Opinion of the ISA for PCT/KR2019/003084, dated Jul. 10, 2019, 5 pages.

Fan, "Towards Energy-Efficient Mobile Sensing: Architectures and Frameworks for Heterogeneous Sensing and Computing", Dissertation submitted in partial fulfillment of the requirements of Doctor of Philosophy in the Department of Computer Science, in the Graduate School of Duke University, 2016, 126 pages.

Extended European Search Report dated Mar. 29, 2021 in EP Application No. 19792879.9.

Office Action dated Jun. 21, 2022 in KR Application No. 10-2018-0048612 and English-language translation.

* cited by examiner

ELECTRONIC DEVICE FOR PROVIDING WI-FI COMMUNICATION AND MOBILE HOTSPOT COMMUNICATION AND METHOD THEREOF

This application is the U.S. national phase of International Application No. PCT/KR2019/003084 filed 18 Mar. 2019, which designated the U.S. and claims priority to KR Patent Application No. 10-2018-0048612 filed 26 Apr. 2018, the entire contents of each of which are hereby incorporated by reference.

Field

Embodiments disclosed in the disclosure relate to an electronic device for providing wireless fidelity (Wi-Fi) communication and mobile hotspot communication and a method thereof.

Description of Related Art

Wi-Fi communication defined by institution of electronic and electronics engineers (IEEE) 802.11 may be used for a wireless local area network (WLAN). An electronic device may establish a link in a specified frequency band (e.g., 2.4 gigahertz (GHz) or 5 GHz) with an access point (AP) disposed in a specified space and may receive data over the established link.

The electronic device may support a mobile hotspot function of playing a role in routing such that an external electronic device may be connected to a network (e.g., the Internet). For example, when the electronic device establishes a mobile hotspot link with the external electronic device through a Wi-Fi protocol, the external electronic device may transmit and receive data with the network over the established link.

Summary

To establish a mobile hotspot link with an external electronic device, an electronic device may transmit and receive a signal via a Wi-Fi module (or chip). Thus, while performing a mobile hotspot function, the electronic device may only use cellular communication (e.g., 3 generation (3G), 4G, or 5G communication) and may fail to provide mobile hotspot communication based on Wi-Fi communication. When the electronic device establishes a mobile hotspot link with the external electronic device while using cellular communication, a user may be charged for communication fees of the electronic device depending on the amount of data transmission of the external electronic device.

The technology (e.g., real simultaneous dual band (RSDB)) where one Wi-Fi module include a plurality of cores to perform a plurality of Wi-Fi communication in a plurality of frequency bands was proposed. However, the cost of producing the electronic device may be increased to mount the Wi-Fi module including the plurality of cores, and current consumption of the Wi-Fi module may be increased while the plurality of cores are simultaneously used.

Various embodiments disclosed in the disclosure are to provide a method for performing Wi-Fi communication and mobile hotspot communication via a Wi-Fi module including one core.

In accordance with an aspect of the disclosure, an electronic device is provided. The electronic device may include at least one antenna, a Wi-Fi module configured to be electrically connected with the at least one antenna, support a Wi-Fi protocol, and include one core, a processor operatively connected with the Wi-Fi module. The processor may be configured to establish a Wi-Fi link on a first channel with an access point (AP), through the Wi-Fi module, establish a mobile hotspot link on the first channel with an external electronic device, through the Wi-Fi module, detect an event associated with a change in state of the Wi-Fi link, and change a state of the mobile hotspot link, based at least on the detected event.

In accordance with another aspect of the disclosure, a method of an electronic device equipped with a Wi-Fi module including one core is provided. The method may include establishing a Wi-Fi link on a first channel with an AP, through the Wi-Fi module, establishing a mobile hotspot link on the first channel with an external electronic device, through the Wi-Fi module, detecting an event associated with a change in state of the Wi-Fi link, and changing a state of the mobile hotspot link, based at least on the detected event.

In accordance with another aspect of the disclosure, an electronic device is provided. The electronic device may include at least one antenna, a Wi-Fi module configured to be electrically connected with the at least one antenna, support a Wi-Fi protocol, and include one core, a processor operatively connected with the Wi-Fi module. The processor may be configured to establish a Wi-Fi link on a first channel with an AP, through the Wi-Fi module, establish a mobile hotspot link on the first channel with an external electronic device, through the Wi-Fi module, receive a first signal commanding to change a channel of the Wi-Fi link from the first channel to a second channel from the AP, change the channel of the Wi-Fi link from the first channel to the second channel, based at least on the first signal, and change a channel of the mobile hotspot channel from the first channel to the second channel.

According to various embodiments disclosed in the disclosure, the electronic device may simultaneously provide Wi-Fi communication and mobile hotspot communication through a Wi-Fi module including one core, thus preventing the cost of producing the electronic device from being increased and preventing communication fees according to the use of the mobile hotspot communication from being incurred.

In addition, various effects ascertained directly or indirectly through the disclosure may be provided.

With regard to description of drawings, the same or similar denotations may be used for the same or similar components.

Detailed Description of Example Embodiments

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Figure 1:
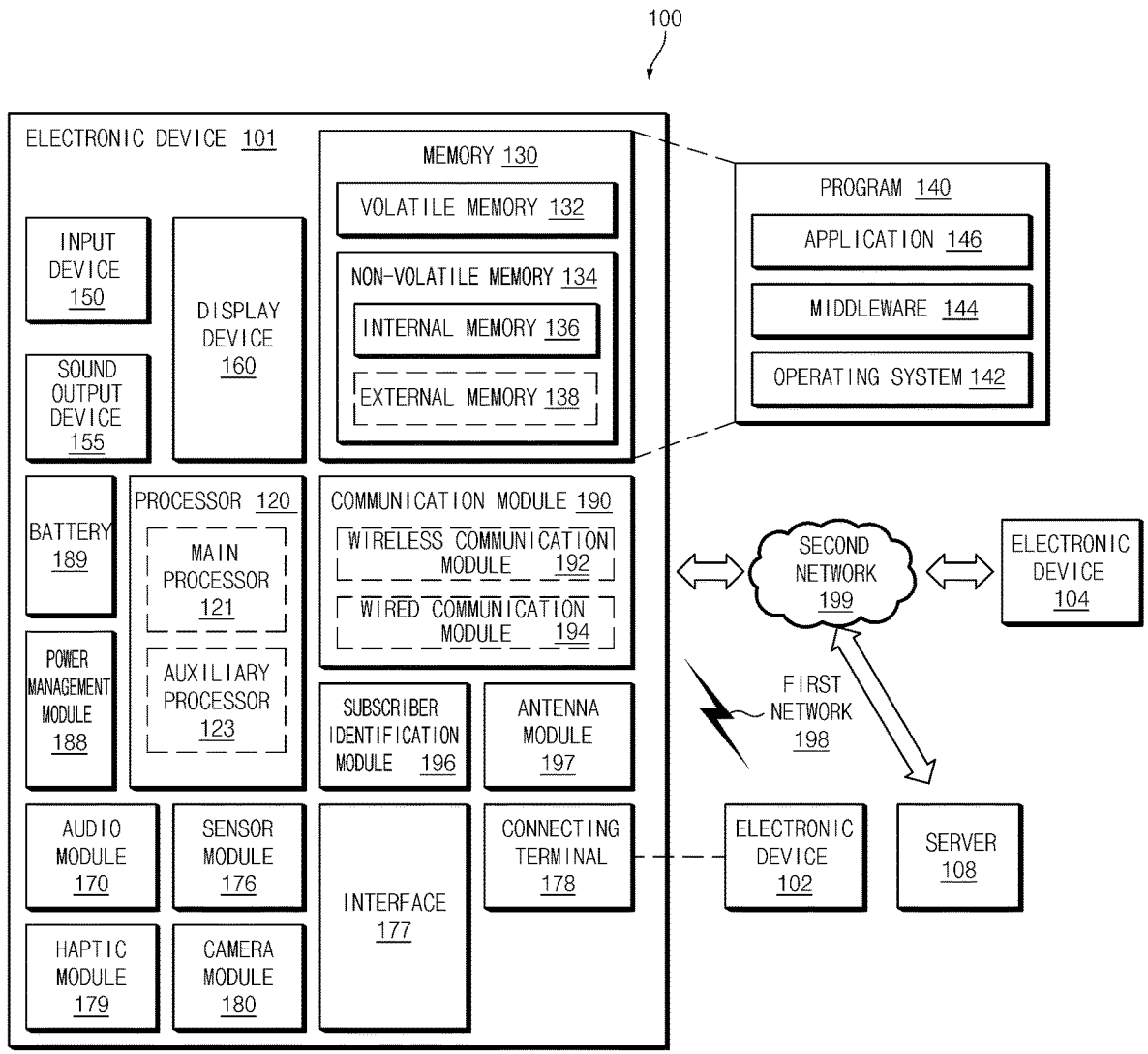
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
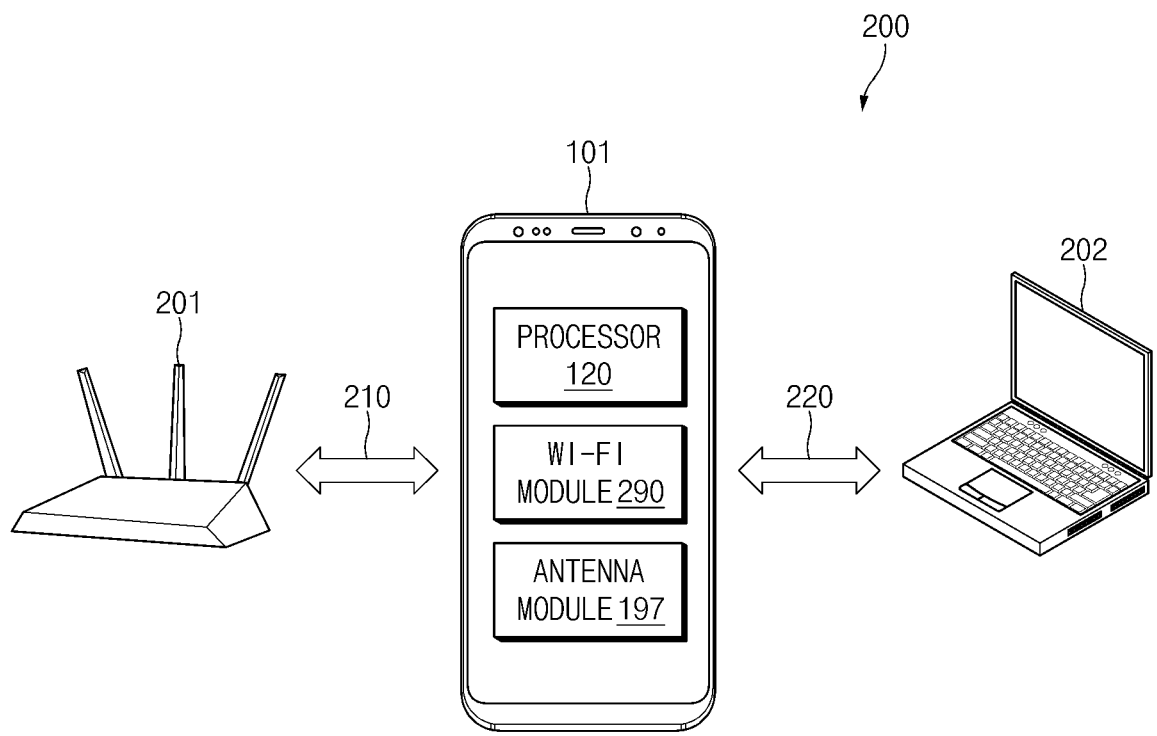
FIG. 2 illustrates an operation of an electronic device using Wi-Fi communication and mobile hotspot communication in a network environment according to various embodiments.

FIG. 2 illustrates an operation of an electronic device using Wi-Fi communication and mobile hotspot communication in a network environment 200 according to various embodiments.

Referring to FIG. 2, in the network environment 200 (e.g., a network environment 100 of FIG. 1), an access point (AP) 201 may play a routing role in relaying a network (e.g., a network 199 of FIG. 1) and an electronic device 101. According to an embodiment, the AP 201 may provide the electronic device 101 with wireless communication based on the Wi-Fi protocol defined in IEEE 802.11.

According to an embodiment, an external electronic device 202 (e.g., an electronic device 102 of FIG. 1) may refer to the same device as the electronic device 101 or a different type of device from the electronic device 101. FIG. 2 illustrates the external electronic device 202 indicating a laptop computer, but the external electronic device 202 may include a portable communication device (e.g., a smartphone), a computer device, a portable multimedia device, a portable medical device, a camera, a wearable device, a virtual reality (VR) device, or a home appliance.

According to an embodiment, the electronic device 101 may refer to a device used by a user. The electronic device 101 may refer to, for example, a terminal, a user equipment (UE), a mobile station, a subscriber station, a remote terminal, a wireless terminal, or a user device. According to an embodiment, the electronic device 101 may include a processor 120, an antenna module 197, and a Wi-Fi module 290 (e.g., at least a part of a communication module 190 of FIG. 1). According to an embodiment, the electronic device 101 may further include at least one other component other than the components shown in FIG. 2. For example, the electronic device 101 may further include a housing (not shown) including the processor 120, the antenna module 197, and the Wi-Fi module 290. For another example, the electronic device 101 may further include at least one component (e.g., a memory 130) shown in FIG. 1.

According to an embodiment, the antenna module 197 may include at least one antenna. The at least one antenna may transmit and receive a signal in the same frequency band and the same channel. For another example, the at least one antenna may transmit and receive a signal, at least one of a frequency band or a channel differs.

According to an embodiment, the Wi-Fi module 290 (or a Wi-Fi chip) may be electrically connected with the at least one antenna included in the antenna module 197 and may support a Wi-Fi protocol.

According to an embodiment, the processor 120 may be operatively connected with the Wi-Fi module 290. The processor 120 may perform the overall function of the electronic device 101 for providing Wi-Fi communication and mobile hotspot communication. For example, the processor 120 may establish a Wi-Fi link 210 for transmitting and receiving data with the AP 201 via the Wi-Fi module 290 on a first channel of a specified frequency band (e.g., a frequency band having a central frequency of 2.4 GHz or 5 GHz). For another example, the processor 120 may establish a mobile hotspot link 220 with the external electronic device 202 via the Wi-Fi module 290. According to an embodiment, the processor 120 may establish the mobile hotspot link 220 on the same channel (i.e., the first channel) as the first channel on which the Wi-Fi link 210 is established.

Figure 3:
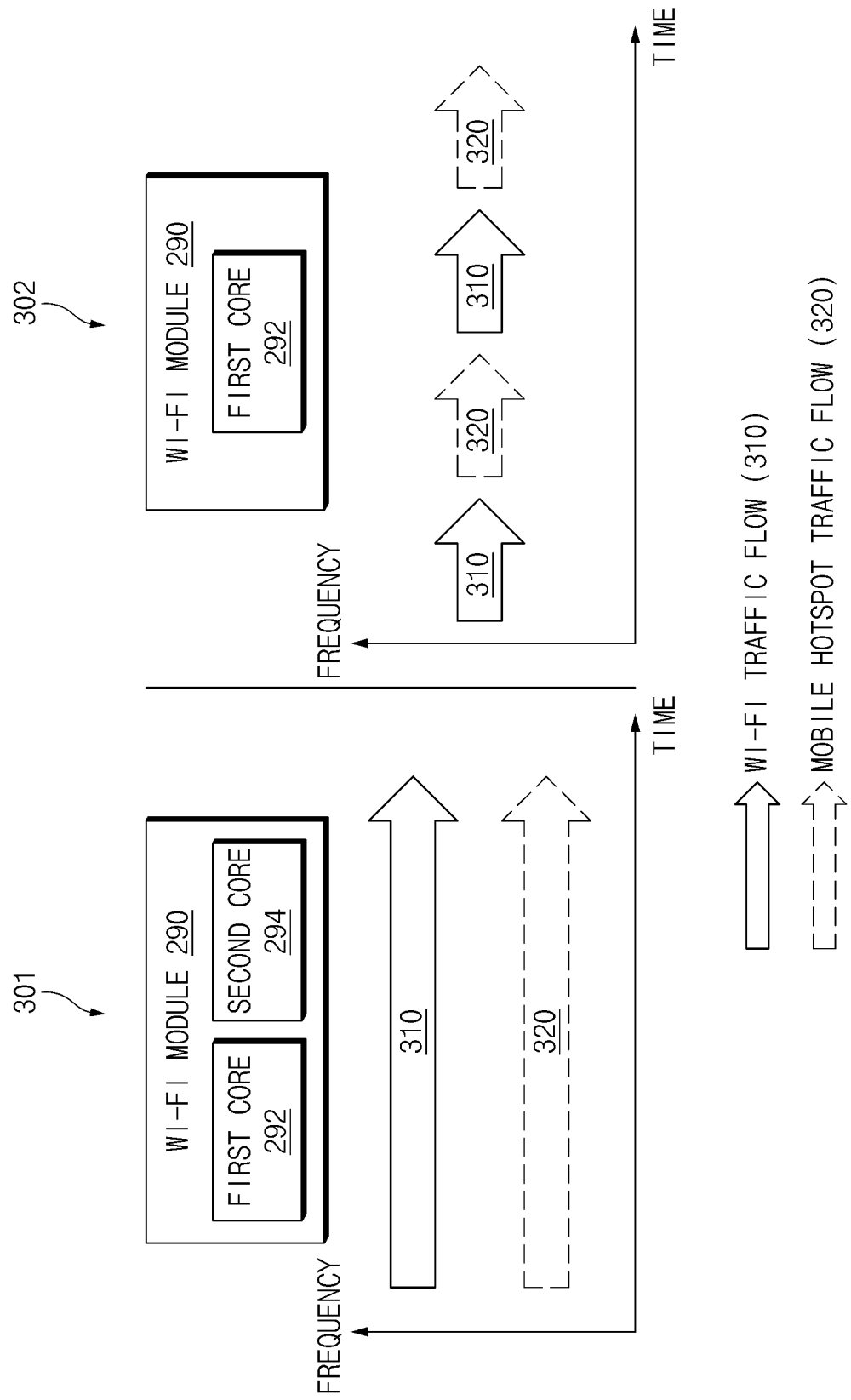
FIG. 3 illustrates an operation of a Wi-Fi module including one core and a Wi-Fi module including a dual core according to various embodiments.

FIG. 3 illustrates an operation of a Wi-Fi module 290 including one core and the Wi-Fi module 290 including a dual core according to various embodiments.

Referring to FIG. 3, the Wi-Fi module 290 may include a core. The core may refer to a software or hardware unit which processes data to transmit a signal of at least one frequency band defined in IEEE 802.11. The Wi-Fi module 290 may include a plurality of cores 292 and 294 as shown in reference numeral 301, or may include the one core 292 as shown in reference numeral 302.

As shown in reference numeral 301, when the Wi-Fi module 290 includes the plurality of cores 292 and 294 according to an embodiment, an electronic device 101 may perform wireless communication in a plurality of frequency bands. For example, the electronic device 101 may perform Wi-Fi communication (e.g., Wi-Fi traffic flow 310) with an AP 201 in a first frequency band (e.g., 2.4 GHz) via the first core 292 and may perform mobile hotspot communication (e.g., mobile hotspot traffic flow 320) with an external electronic device 202 in a second frequency band (e.g., 5 GHz) via the second core 294.

As shown in reference numeral 302, when the Wi-Fi module 290 include one core (e.g., the first core 292) according to an embodiment, the cost of producing the electronic device 101 may be more reduced than that in mounting the plurality of cores 292 and 294. Furthermore, the Wi-Fi module 290 may enable the one core 292 to reduce power consumption required to enable the plurality of cores 292 and 294.

According to an embodiment, the electronic device 101 may perform the Wi-Fi communication 310 and the mobile hotspot communication 320 by means of the one core. When the Wi-Fi communication 310 and the mobile hotspot communication 320 are performed in different frequency bands, a delay may occur while the frequency bands are switched. When the Wi-Fi communication 310 and the mobile hotspot communication 320 are performed on different channels of the same frequency band, inter-channel interference may occur. As shown in reference numeral 302, the electronic device 101 according to an embodiment may perform the Wi-Fi communication 310 and the mobile hotspot communication 320 in the same frequency band and the same channel using a time sharing scheme.

According to an embodiment, the frequency band where the Wi-Fi communication 310 and the mobile hotspot communication 320 are performed may be 2.4 GHz or 5 GHz. According to IEEE 802.11, because the number of channels allocated in the 5 GHz frequency band is greater than the number of channels allocated in 2.4 GHz frequency band and because the signal transmitted and received in the 5 GHz frequency band is less in noise than the signal transmitted and received in the 2.4 GHz frequency band, the electronic device 101 may perform the Wi-Fi communication 310 and the mobile hotspot communication 320 in the 5 GHz frequency band.

According to an embodiment, the 5 GHz frequency band may include a channel limiting the mobile hotspot communication 320. For example, at least one channel in the 5 GHz frequency band may be an indoor-only channel or a dynamic frequency selection (DFS) channel. The indoor-only channel may refer to a channel where the mobile hotspot communication 302 is permitted only indoors. The DFS channel may refer to a channel used in a radar or an artificial satellite for a public purpose such as national defense or a weather forecast. The AP 201 may perform Wi-Fi communication over the DFS channel in only a condition supporting a DFS master function. When supporting the DFS master function, the AP 201 may periodically or aperiodically monitor a radar signal (or an artificial satellite signal) on the channel where Wi-Fi communication is performed. When the radar signal (or the artificial satellite signal) is detected, the AP 201 may re-establish a Wi-Fi link on a non-DFS channel with the electronic device 101. According to an embodiment, the electronic device 101 may fail to support the DFS function to ensure a mounting space and prevent power consumption required to detect a radar signal. In this case, the electronic device 101 may receive information indicating whether a radar signal of the DFS channel is detected from the AP 201 or may identify the DFS channel by storing information about the DFS channel in a memory (e.g., a memory 130 of FIG. 1) in advance. According to an embodiment, the DFS channel may differ for each country.

As described above, to use the Wi-Fi communication 310 and the mobile hotspot communication 320 in the 5 GHz frequency band through one core, the electronic device 101 needs to conform to regulation by the indoor-only channel or the DFS channel. In various embodiments described in FIGS. 4 to 10 below, the electronic device 101 may change a state (e.g., a channel or the intensity of a transmitted signal) of a mobile hotspot link 220 depending on a state of a Wi-Fi link 210 (e.g., whether it is the indoor-only channel or the DFS channel).

Figure 4:
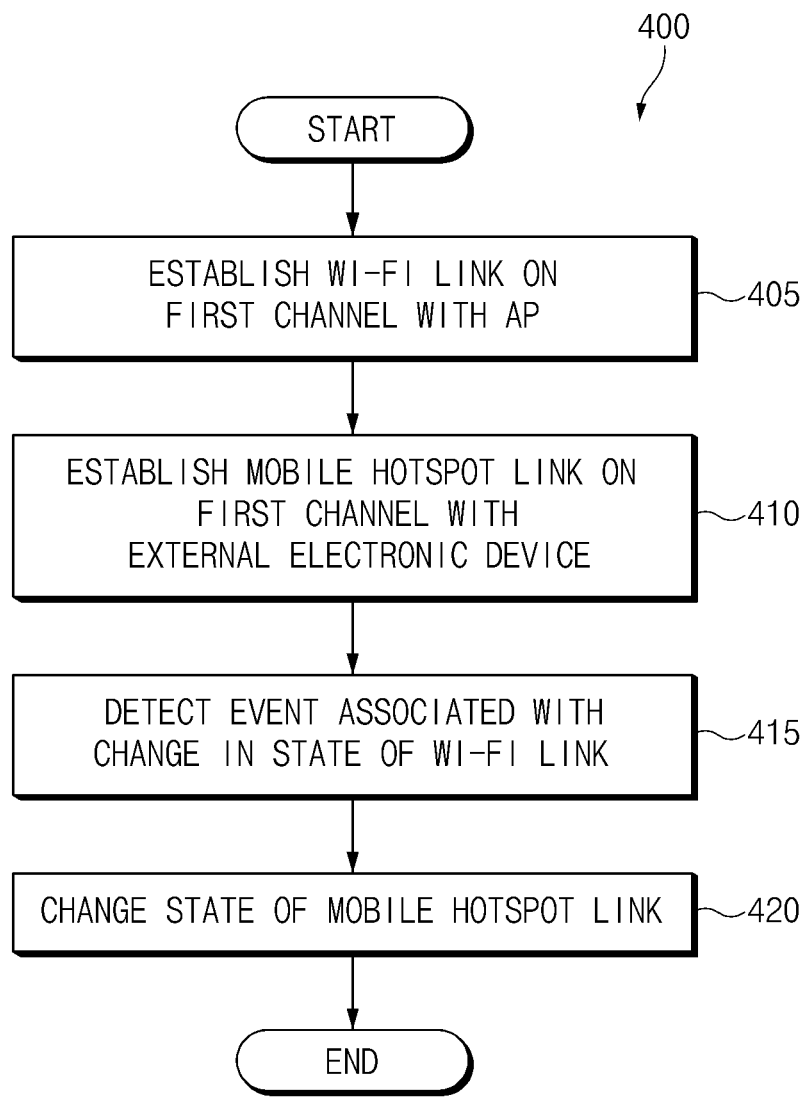
FIG. 4 illustrates an operational flowchart of an electronic device for changing a state of a mobile hotspot link depending on a change in state of a Wi-Fi link according to various embodiments.

FIG. 4 illustrates an operational flowchart of an electronic device 101 for changing a state of a mobile hotspot link 220 depending on a change in state of a Wi-Fi link 210 according to various embodiments. Operations shown in FIG. 4 may be performed by the electronic device 101 or a component (e.g., a processor 120) included in the electronic device 101.

Referring to FIG. 4, in operation 405 of a method 400, the electronic device 101 (e.g., the processor 120) may establish the Wi-Fi link 210 on a first channel with an AP 201.

In operation 410, the electronic device 101 may establish the mobile hotspot link 220 on the first channel with an external electronic device 202. According to an embodiment, the electronic device 101 may establish the mobile hotspot link 220 through a Wi-Fi module 290 including one core. The electronic device 101 may perform Wi-Fi communication and mobile hotspot communication on the first channel using a time sharing scheme.

In operation 415, the electronic device 101 may detect an event associated with a change in state of the Wi-Fi link 210. According to an embodiment, the event associated with the change in the state of the Wi-Fi link 210 may refer to when the first channel is a DFS channel. For example, the AP 201 may obtain a radar signal or an artificial satellite signal while performing Wi-Fi communication 310 with the electronic device 101. When the AP 201 transmits a first signal to command to change the channel of the Wi-Fi link 210 from the first channel to a second channel which is a non-DFS channel to the electronic device 101, the electronic device 101 may identify that the first channel is the DFS channel. For another example, when the Wi-Fi link 210 between the electronic device 101 and the AP 201 is disconnected, the electronic device 101 may identify that the first channel is the DFS channel by means of information previously stored in a memory 130. According to another embodiment, the event associated with the change in the state of the Wi-Fi link 210 may refer to when the first channel is an indoor-only channel. For example, the electronic device 101 may receive information indicating that the first channel is the indoor-only channel from the AP 201 or may identify that the first channel is the indoor-only channel by means of information previously stored in the memory of the electronic device 101.

In operation 420, the electronic device 101 may change a state of the mobile hotspot link 220 based at least on the detected state of the Wi-Fi link 210. According to an embodiment, the state of the mobile hotspot link 220 may refer to a channel. For example, the electronic device 101 may detect that the first channel of the Wi-Fi link 210 is the DFS channel and may change the channel of the mobile hotspot link 220 from the first channel to the second channel in response to changing from the first channel to the second channel which is the non-DFS channel. As another embodiment, the state of the mobile hotspot link 220 may refer to the intensity of a transmitted signal which is transmitted to an external electronic device 202 by the electronic device 101. For example, the electronic device 101 may change the intensity of a transmitted signal such that coverage of the electronic device 101 is included in coverage of the AP 201 in response to detecting that the first channel of the Wi-Fi link 210 is the indoor-only channel.

Through the above-mentioned method, the electronic device 101 may reduce the cost of producing the electronic device 101 by mounting the Wi-Fi module 290 including one core and may reduce consumption of data fees of the user by performing Wi-Fi communication and mobile hotspot communication on at least some channels limited by regulation in the 5 GHz frequency band.

Figure 5:
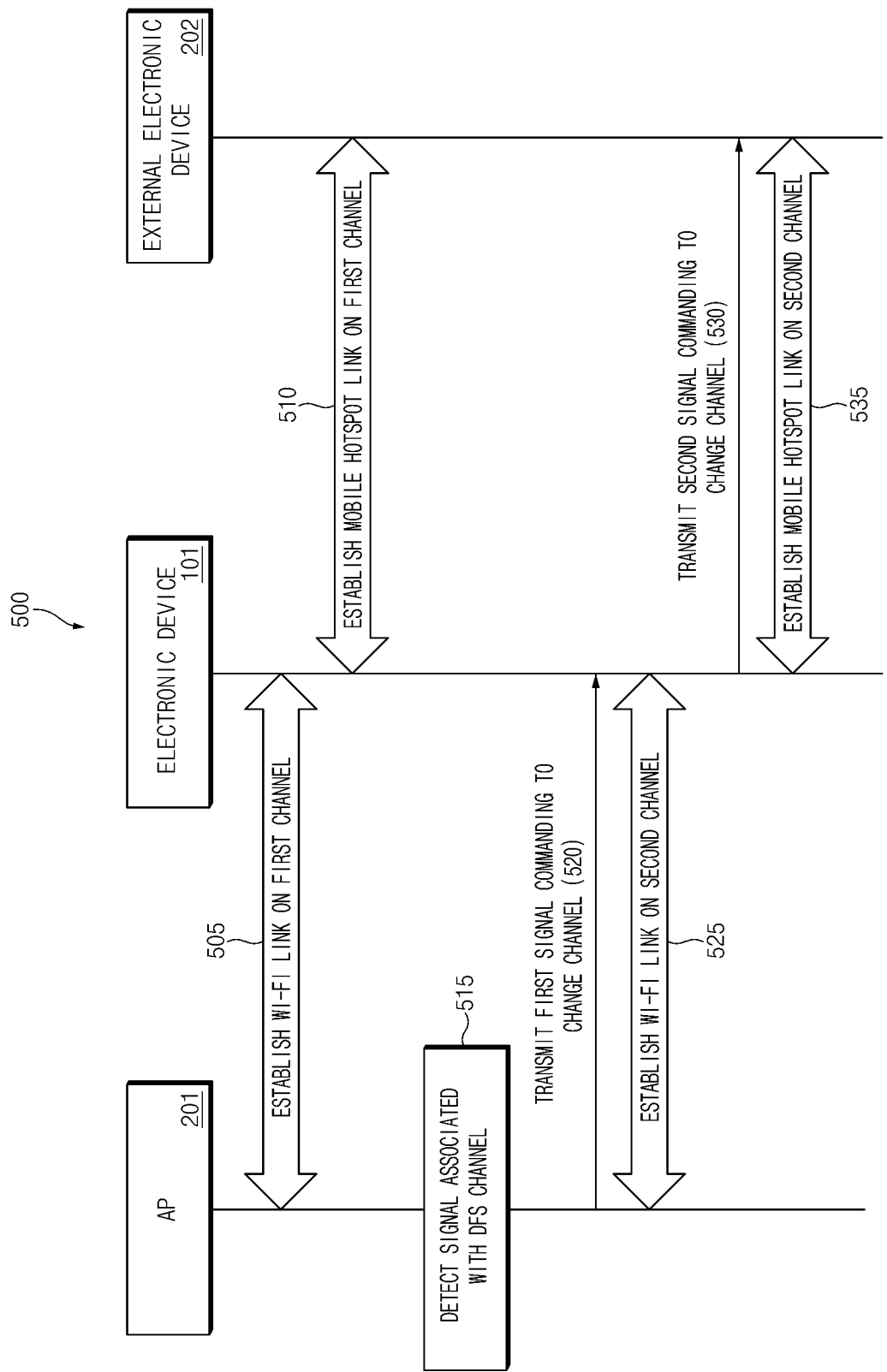
FIG. 5 illustrates a signal sequence diagram of an access point (AP) and an electronic device for changing a change based on a dynamic frequency selection (DFS) channel according to various embodiments.

FIG. 5 illustrates a signal sequence diagram of an AP 201 and an electronic device 101 for changing a change based on a DFS channel according to various embodiments.

Referring to FIG. 5, in operation 505 of a network environment 500 (e.g., a network environment 200 of FIG. 2), an AP 201 and an electronic device 101 may establish a Wi-Fi link 210 on a first channel. The first channel may refer to at least some of a plurality of channels included in the 5 GHz frequency band.

After the Wi-Fi link 210 is established, in operation 510, the electronic device 101 may establish a mobile hotspot link 220 on the first channel with an external electronic device 202. According to an embodiment, the electronic device 101 may establish the mobile hotspot link 220 in response to receiving a user input requesting to establish the mobile hotspot link 220 or receiving a request message from the external electronic device 202.

In operation 515, the AP 201 may detect a signal associated with a DFS channel on the first channel. The signal associated with the DFS channel may refer to, for example, a radar signal.

In operation 520, the AP 201 may transmit a first signal commanding to change a channel to the electronic device 101. According to an embodiment, the first signal may include at least one of information indicating that the first channel is the DFS channel or information about a second channel. According to an embodiment, the first signal may include information about a timer.

In operation 525, the AP 201 and the electronic device 101 may establish the Wi-Fi link 210 on the second channel. According to an embodiment, when the first signal includes the information about the timer, the electronic device 101 may start the timer and may establish the Wi-Fi link 210 with the AP 201 before the timer expires. Although not illustrated in FIG. 5, when the timer expires before the Wi-Fi link 210 is established on the second channel, the Wi-Fi link 210 may be disconnected.

In operation 530, the electronic device 101 may transmit a second signal commanding to change a channel of the mobile hotspot link 220 to the external electronic device 202. FIG. 5 illustrates an embodiment in which the electronic device 101 performs operation 530 after operation 525, but operation 530 may be performed independently of operation 525. For example, while establishing the Wi-Fi link 210 on the second channel with the AP 201, the electronic device 101 may transmit the second signal to the external electronic device 202.

In operation 535, the electronic device 101 and the external electronic device 202 may establish the mobile hotspot link 220 on the second channel. According to an embodiment, electronic device 101 may perform operation 535 independently of operation 525. For example, while establishing the Wi-Fi link 210 on the second channel with the AP 201, the electronic device 101 may establish the mobile hotspot link 220 on the second channel with the external electronic device 202.

Figure 6:
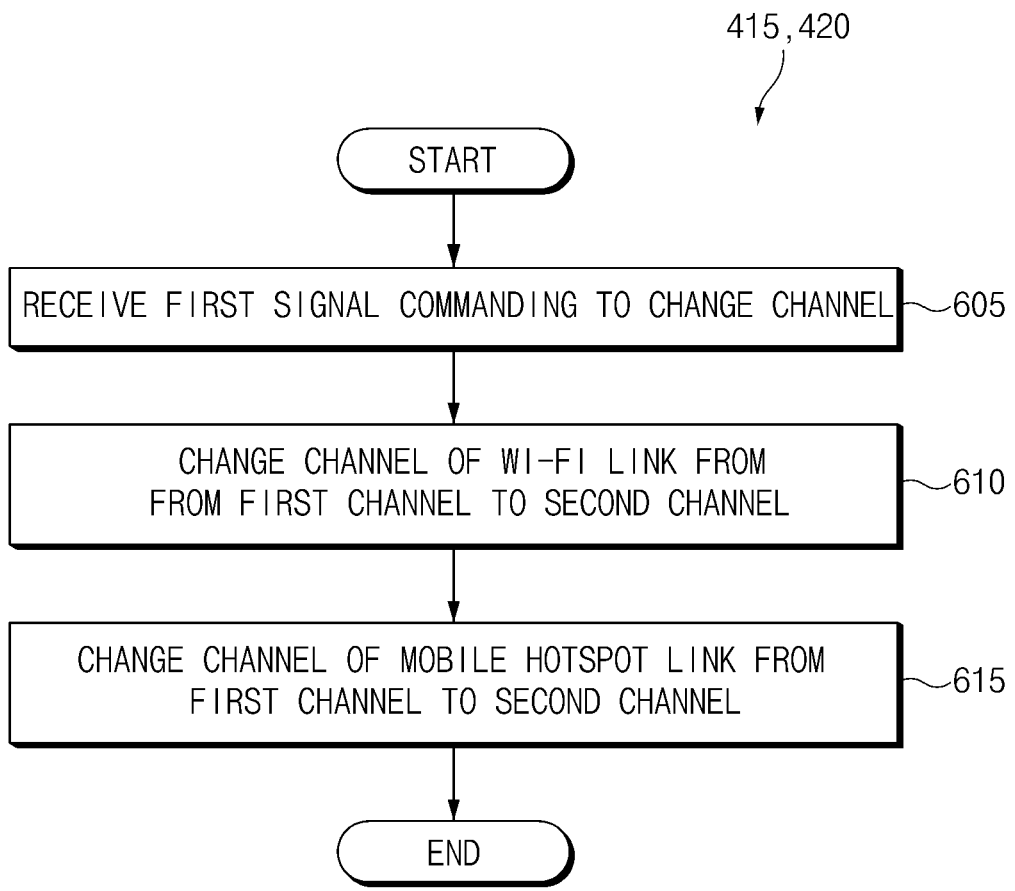
FIG. 6 illustrates an operational flowchart of an electronic device for changing a channel based on a DFS channel according to various embodiments.

FIG. 6 illustrates an operational flowchart of an electronic device 101 for changing a channel based on a DFS channel according to various embodiments. Operations shown in FIG. 6 may refer to operations where operations 415 and 420 of FIG. 4 are performed in detail.

Referring to FIG. 6, after a Wi-Fi link 210 is established on a first channel, in operation 605, an electronic device 101 may receive a first signal commanding to change a channel from an AP 201.

In operation 610, the electronic device 101 may change the channel of the Wi-Fi link 210 from the first channel to a second channel. In other words, the electronic device 101 may establish the Wi-Fi link 210 on the second channel with the AP 201.

In operation 615, the electronic device 101 may change the channel of a mobile hotspot link 220 from the first channel to the second channel. For example, the electronic device 201 may transmit a second signal commanding to change a channel to an external electronic device 202 and may establish the mobile hotspot link 220 with the external electronic device 202 on the second channel.

Figure 7:
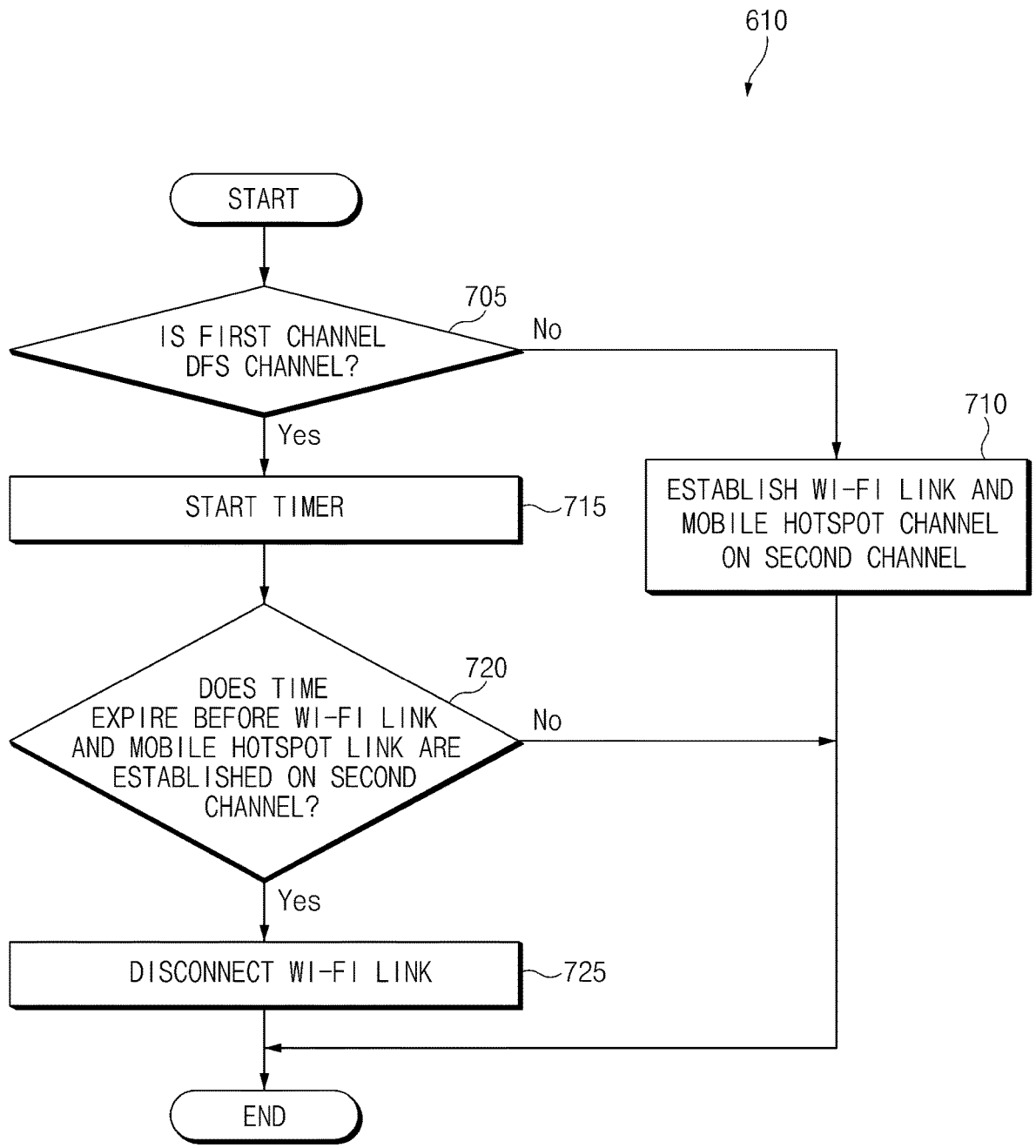
FIG. 7 illustrates an operational flowchart of an electronic device for changing a channel based on a timer according to various embodiments.

FIG. 7 illustrates an operational flowchart of an electronic device 101 for changing a channel based on a timer according to various embodiments. Operations shown in FIG. 7 may refer to operations where operation 610 of FIG. 6 is performed in detail.

Referring to FIG. 7, after receiving a first signal commanding to change a channel from an AP 201, in operation 705, an electronic device 101 may identify whether a first channel is a DFS channel. For example, the electronic device 101 may identify whether the first channel is the DFS channel based on information included in the first signal or information previously stored in a memory 130 of the electronic device 101. When the first channel is not the DFS channel, in operation 710, the electronic device 101 may establish a Wi-Fi link 210 with the AP 201 on the second channel or may establish a mobile hotspot link 220 on the second channel with an external electronic device 202. According to an embodiment, the electronic device 101 may independently perform the operation of establishing the Wi-Fi link 210 and the operation of establishing the mobile hotspot link 220. The Wi-Fi link 210 may be first established or the mobile hotspot link 220 may be first established.

When the first channel is the DFS channel, in operation 715, the electronic device 101 may start a timer. The electronic device 101 may establish the Wi-Fi link 210 on the second channel with the AP 201 at substantially the same time as starting the timer and may establish the mobile hotspot link 220 on the second channel with the external electronic device 202.

In operation 720, the electronic device 101 may identify whether the timer expires before the Wi-Fi link 210 and the mobile hotspot link 220 are established on the second channel. When the timer does not expire, the electronic device 101 may end the algorithm of FIG. 7.

When the timer expires before the Wi-Fi link 210 and the mobile hotspot link 220 are established on the second channel, in operation 725, the electronic device 101 may disconnect the Wi-Fi link 210. Although not illustrated in FIG. 7, according to an embodiment, the electronic device 101 may change the channel of the mobile hotspot link 220 from the first channel to the second channel to avoid regulation of the DFS channel after the Wi-Fi link 210 is disconnected. As another embodiment, the electronic device 101 may disconnect the mobile hotspot link 220 established on the first channel.

Figure 8:
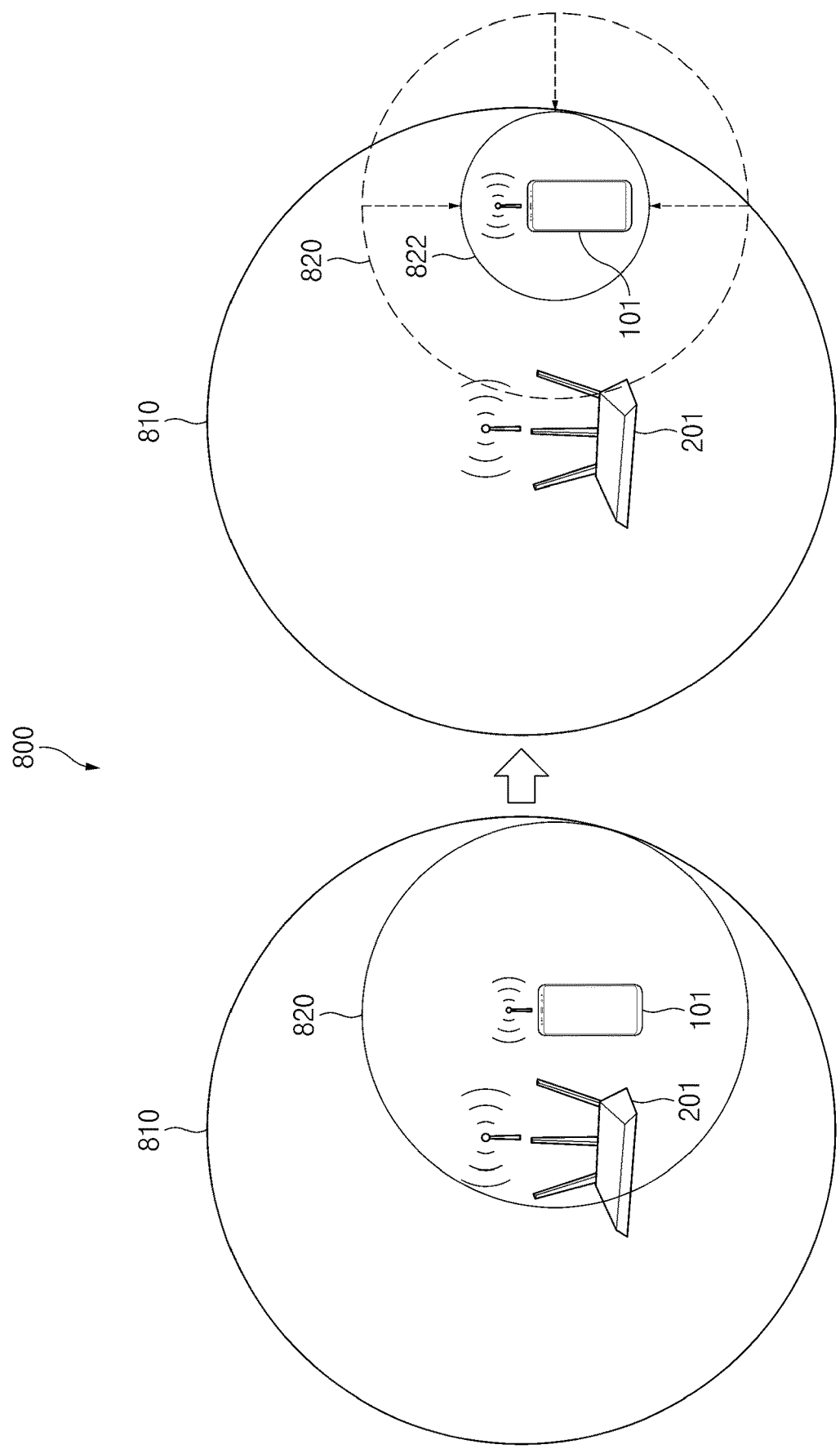
FIG. 8 illustrates an operation of an electronic device for changing the intensity of a transmitted signal based on an indoor-only channel according to various embodiments.

FIG. 8 illustrates an operation of an electronic device for changing the intensity of a transmitted signal based on an indoor-only channel according to various embodiments. A size and a shape of coverage (e.g., first coverage 810 or second coverage 820) shown in FIG. 8 are not limited to the example shown in FIG. 8.

Referring to FIG. 8, in a network environment 800 (e.g., a network environment 200 of FIG. 2), an AP 201 may have the first coverage 810 of a specified size depending on the intensity of a transmitted signal. The electronic device 101 may perform Wi-Fi communication 310 with the AP 201 in the first coverage 810.

According to an embodiment, the electronic device 101 may have the second coverage 820 of a specified size depending on the intensity of a transmitted signal. The electronic device 101 may perform mobile hotspot communication 320 with an external electronic device (e.g., an external electronic device 202) included in the range of the second coverage 820.

According to an embodiment, when a first channel is an indoor-only channel, the mobile hotspot communication 310 may be permitted only indoors according to regulation. For example, the second coverage 820 should be included in the first coverage 810. The second coverage 820 may depart from the first coverage 810 by mobility of the electronic device 101 or a change in size of the first coverage 810 according to a change in intensity of a transmitted signal. According to an embodiment, the electronic device 101 may change the intensity of a transmitted signal such that the second coverage 820 is included in the first coverage 810, thus changing the size of the second coverage 820 to a specified size (e.g., third coverage 822).

Figure 9:
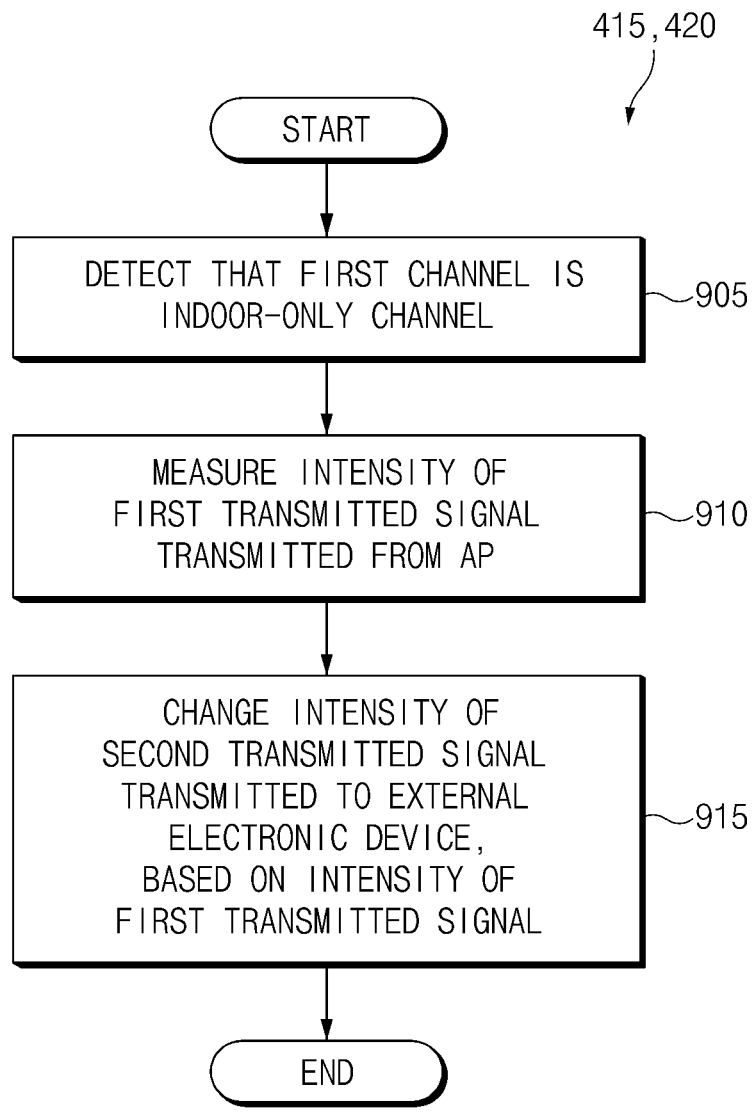
FIG. 9 illustrates an operational flowchart of an electronic device for changing the intensity of a transmitted signal based on an indoor-only channel according to various embodiments.

FIG. 9 illustrates an operational flowchart of an electronic device 101 for changing the intensity of a transmitted signal based on an indoor-only channel according to various embodiments. Operations shown in FIG. 9 may refer to operations where operations 415 and 420 of FIG. 4 are performed in detail.

Referring to FIG. 9, after a Wi-Fi link 210 is established on the first channel, in operation 905, an electronic device 101 may detect that the first channel is an indoor-only channel. For example, the electronic device 101 may receive information indicating that the first channel is the indoor-only channel from an AP 201 or may identify that the first channel is the indoor-only channel based on information previously stored in a memory 130 of the electronic device 101.

In operation 910, the electronic device 101 may measure the intensity of a first transmitted signal transmitted from the AP 201.

In operation 915, the electronic device 101 may change the intensity of a second transmitted signal transmitted to an external electronic device 202 based at least on the measured intensity of the first transmitted signal. The electronic device 101 may change the intensity of the second transmitted signal such that second coverage 820 of FIG. 8 is included in first coverage 810.

Although not illustrated in FIG. 9, the electronic device 101 may change the channel of the mobile hotspot link 220 from the first channel to a third channel, which is not the indoor-only channel, to avoid regulation of the indoor-only channel after the Wi-Fi link 210 is disconnected. As another embodiment, the electronic device 101 may disconnect the mobile hotspot link 220 established on the first channel.

Figure 10:
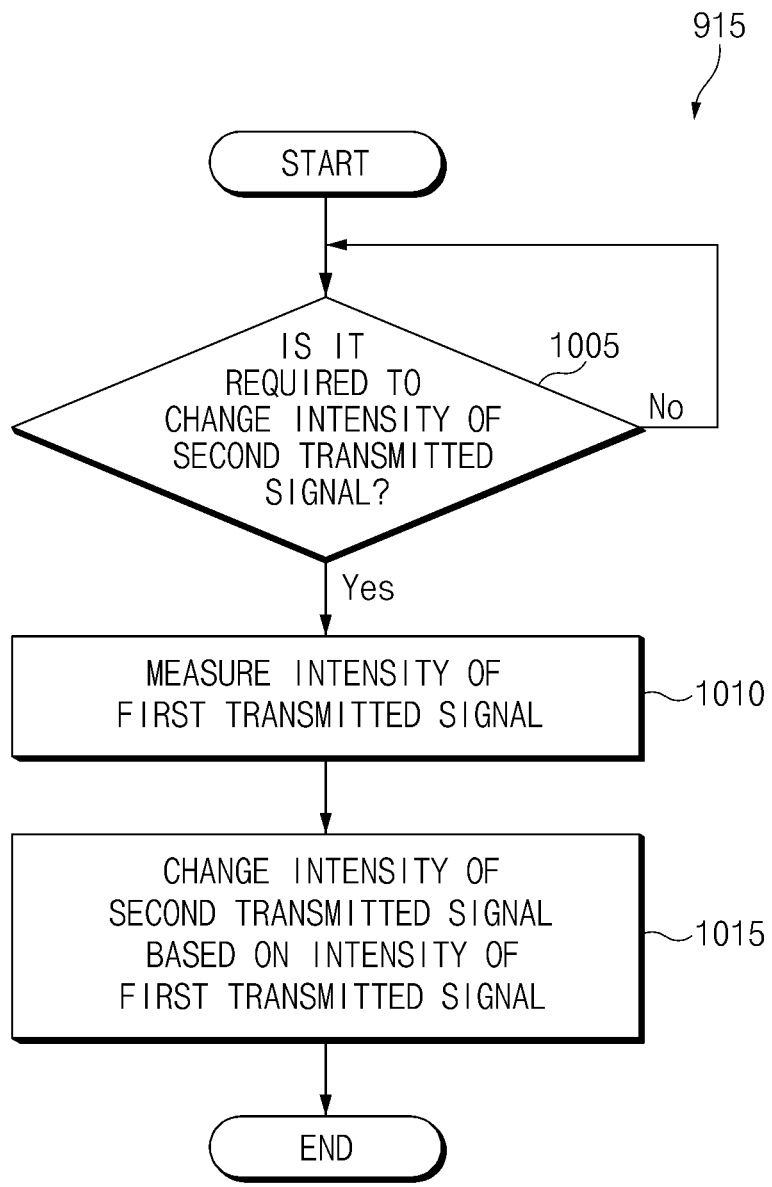
FIG. 10 illustrates an operational flowchart of an electronic device for changing the intensity of a transmitted signal additionally after changing the intensity of the transmitted signal according to various embodiments.

FIG. 10 illustrates an operational flowchart of an electronic device 101 for changing the intensity of a transmitted signal additionally after changing the intensity of the transmitted signal according to various embodiments.

Referring to FIG. 10, after the intensity of a second transmitted signal is changed, in operation 1005, an electronic device 101 may periodically or aperiodically identify whether it is required to change the intensity of the second transmitted signal. For example, when movement of the electronic device 101 is detected, the electronic device 101 may identify whether second coverage 820 departs from the range of first coverage 810 based on at least one of a location of the electronic device 101, the intensity of a first transmitted signal, or the intensity of the second transmitted signal. For another example, the electronic device 101 may periodically or aperiodically measure the intensity of the first transmitted signal and may identify whether the measured intensity of the first transmitted signal is reduced. When there is no need to change the intensity of the second transmitted signal, the electronic device may repeatedly perform operation 1005.

In operation 1010, the electronic device 101 may measure the intensity of the first transmitted signal. When measuring the intensity of the first transmitted signal in operation 1005, the electronic device 101 may fail to perform operation 1010.

In operation 1015, the electronic device 101 may change the intensity of the second transmitted signal based at least on the intensity of the first transmitted signal.

Figure 11:
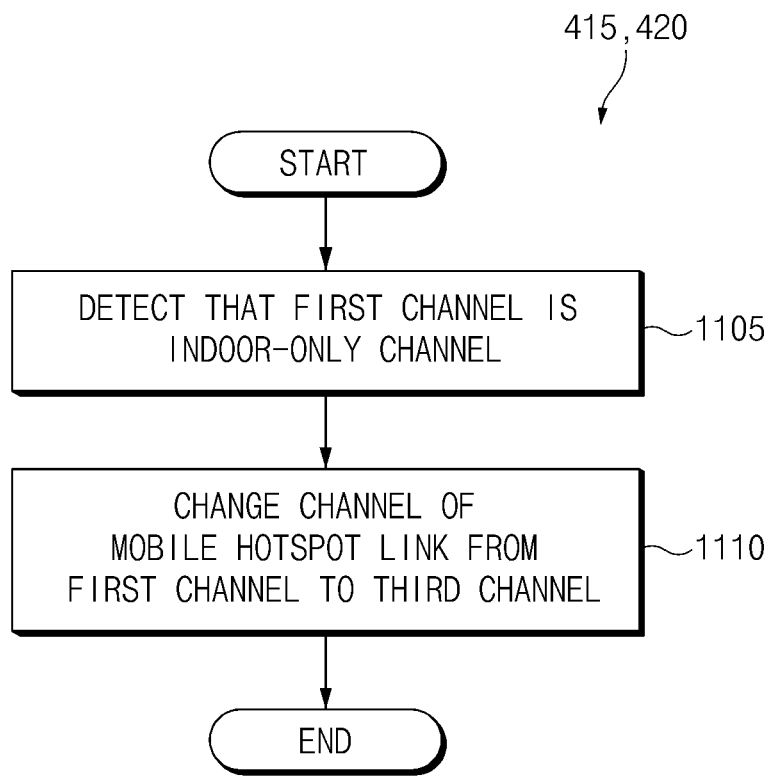
FIG. 11 illustrates an operational flowchart of an electronic device for changing a channel based on an indoor-only channel according to various embodiments.

FIG. 11 illustrates an operational flowchart of an electronic device 101 for changing a channel based on an indoor-only channel according to various embodiments. Operations shown in FIG. 11 may refer to operations where operations 415 and 420 of FIG. 4 are performed in detail.

Referring to FIG. 11, in operation 1105, an electronic device 101 may detect that a first channel is an indoor-only channel. For example, the electronic device 101 may receive information indicating that the first channel is the indoor-only channel from an AP 201 or may identify that the first channel is the indoor-only channel based on the intensity of a signal received from the AP 201 or information previously stored in a memory 130 of the electronic device 101.

In operation 1110, the electronic device 101 may change the channel of a mobile hotspot link 220 from the first channel to a third channel which is not the indoor-only channel. Through the above-mentioned method, the electronic device 101 may perform Wi-Fi communication 310 and mobile hotspot communication 320 in a frequency band including the indoor-only channel.

As described above, an electronic device (e.g., an electronic device 101 of FIG. 1) may include a housing, at least one antenna (e.g., at least a part of an antenna module 197 of FIG. 1) located in the housing, a Wi-Fi module (e.g., a Wi-Fi module 290 of FIG. 2) which is electrically connected with the at least one antenna, supports a Wi-Fi protocol, and includes one core (e.g., a first core 292 of FIG. 3), a processor (e.g., a processor 120 of FIG. 1) located in the housing and operatively connected with the Wi-Fi module, and a memory (e.g., a memory 130 of FIG. 1) operatively connected with the processor. The memory may store instructions, when executed, causing the processor to establish a Wi-Fi link (e.g., a Wi-Fi link 210 of FIG. 2) on a first channel with an AP (e.g., an AP 201 of FIG. 2), through the Wi-Fi module, establish a mobile hotspot link (e.g., a mobile hotspot link 220 of FIG. 2) on the first channel with an external electronic device (e.g., an external electronic device 202 of FIG. 2), through the Wi-Fi module, detect an event associated with a change in state of the Wi-Fi link, and change a state of the mobile hotspot link, based at least on the detected event.

According to an embodiment, the instructions may cause the processor to receive a first signal commanding to change a channel of the Wi-Fi link from the first channel to a second channel from the AP, change the channel of the Wi-Fi link from the first channel to the second channel based at least on the first signal, and change a channel of the mobile hotspot link from the first channel and the second channel.

According to an embodiment, the first channel may be a DFS channel and the second channel may be a non-DFS channel.

According to an embodiment, the first signal may include information about a timer. The instructions may cause the processor to start the timer based at least on the information about the timer and change the channel of the Wi-Fi link and the mobile hotspot link from the first channel to the second channel while the timer is running.

According to an embodiment, the instructions may cause the processor to disconnect the Wi-Fi link, when the timer expires before changing the channel of the Wi-Fi link and the mobile hotspot link from the first channel to the second channel, and disconnect the mobile hotspot link.

According to an embodiment, the instructions may cause the processor to transmit, to the external electronic device, a second signal commanding to change the channel of the mobile hotspot link from the first channel to the second channel and change the channel of the mobile hotspot link from the first channel to the second channel, based at least on the second signal.

According to an embodiment, the instructions may cause the processor to detect that the first channel is an indoor-only channel capable of being permitted only indoors, measure intensity of a first transmitted signal transmitted from the AP, and change intensity of a second transmitted signal transmitted to the external electronic device, based on the intensity of the first transmitted signal.

According to an embodiment, the instructions may cause the processor to detect that there is a change in location of the electronic device after changing the intensity of the second transmitted signal, measure the intensity of the first transmitted signal, and change the intensity of the second transmitted signal, based on the intensity of the first transmitted signal.

As described above, a method of an electronic device (e.g., an electronic device 101 of FIG. 1) equipped with a Wi-Fi module (e.g., a Wi-Fi module 290 of FIG. 2) including one core (e.g., a first core 292 of FIG. 3) may include establishing a Wi-Fi link on a first channel with an AP, through the Wi-Fi module, establishing a mobile hotspot link on the first channel with an external electronic device, through the Wi-Fi module, detecting an event associated with a change in state of the Wi-Fi link, and changing a state of the mobile hotspot link, based at least on the detected event.

According to an embodiment, the first channel is a DFS channel. The detecting of the event associated with the change in the state of the Wi-Fi link may include receiving a first signal commanding to change a channel of the Wi-Fi link from the first channel to a second channel from the AP and changing the channel of the Wi-Fi link from the first channel to the second channel based at least on the first signal. The changing of the state of the mobile hotspot link may include changing the channel of the mobile hotspot link from the first channel to the second channel.

According to an embodiment, the first signal may include information about a timer. The method may further include starting the timer based at least on the information about the timer and changing the channel of the Wi-Fi link and the mobile hotspot link from the first channel to the second channel while the timer is running.

According to an embodiment, the method may further include disconnecting the Wi-Fi link, when the timer expires before changing the channel of the Wi-Fi link and the mobile hotspot link from the first channel to the second channel, and disconnecting the mobile hotspot link.

According to an embodiment, the changing of the channel of the mobile hotspot link from the first channel to the second channel may further include transmitting, to the external electronic device, a second signal commanding to change the channel of the mobile hotspot link from the first channel to the second channel.

According to an embodiment, the detecting of the event associated with the change in the state of the Wi-Fi link may include detecting that the first channel is an indoor-only channel capable of being permitted only indoors. The changing of the state of the mobile hotspot link may include measuring intensity of a first transmitted signal transmitted from the AP and changing intensity of a second transmitted signal transmitted to the external electronic device, based on the intensity of the first transmitted signal.

According to an embodiment, the method may further include detecting that there is a change in location of the electronic device after changing the intensity of the second transmitted signal, measuring the intensity of the first transmitted signal, and changing the intensity of the second transmitted signal based on the intensity of the first transmitted signal.

As described above, an electronic device (e.g., an electronic device 101 of FIG. 1) may include a housing, at least one antenna (e.g., at least a part of an antenna module 197 of FIG. 1) located in the housing, a Wi-Fi module (e.g., a Wi-Fi module 290 of FIG. 2) which is electrically connected with the at least one antenna, supports a Wi-Fi protocol, and includes one core (e.g., a first core 292 of FIG. 3), a processor (e.g., a processor 120 of FIG. 1) located in the housing and operatively connected with the Wi-Fi module, and a memory (e.g., a memory 130 of FIG. 1) operatively connected with the processor. The memory may store instructions, when executed, causing the processor to establish a Wi-Fi link (e.g., a Wi-Fi link 210 of FIG. 2) on a first channel with an AP (e.g., an AP 201 of FIG. 2), through the Wi-Fi module, establish a mobile hotspot link (e.g., a mobile hotspot link 220 of FIG. 2) on the first channel with an external electronic device (e.g., an external electronic device 202 of FIG. 2), through the Wi-Fi module, receive a first signal commanding to change a channel of the Wi-Fi link from the first channel to a second channel from the AP, change the channel of the Wi-Fi link from the first channel to the second channel, based at least on the first signal, and change a channel of the mobile hotspot channel from the first channel to the second channel.

According to an embodiment, the first channel is a DFS channel and the second channel is a non-DFS channel.

According to an embodiment, the first signal may include information about a timer. The instructions may cause the processor to start the timer based at least on the information about the timer and change the channel of the Wi-Fi link and the mobile hotspot link from the first channel to the second channel while the timer is running.

According to an embodiment, the instructions may cause the processor to disconnect the Wi-Fi link, when the timer expires before changing the channel of the Wi-Fi link and the mobile hotspot link from the first channel to the second channel, and disconnect the mobile hotspot link.

According to an embodiment, the instructions may cause the processor to transmit, to the external electronic device, a second signal commanding to change the channel of the mobile hotspot link from the first channel to the second channel and change the channel of the mobile hotspot link from the first channel to the second channel, based at least on the second signal.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising: a housing; at least one antenna located in the housing;
a wireless fidelity (Wi-Fi) module configured to be electrically connected with the at least one antenna, support a Wi-Fi protocol, and include one core; a processor located in the housing and operatively connected with the Wi-Fi module; and a memory operatively connected with the processor, wherein the memory stores instructions, when executed by the processor, causing the electronic device to: establish a Wi-Fi link on a first channel with an access point (AP), through the Wi-Fi module; establish a mobile hotspot link on the first channel with an external electronic device, through the Wi-Fi module; detect an event associated with a change in state of the WiFi link; and change a state of the mobile hotspot link, based at least on the detected event, wherein the detecting of the event associated with the change in the state of the WiFi link includes: detecting that the first channel is an indoor-only channel capable of being permitted only indoors, and wherein the changing of the state of the mobile hotspot link includes: measuring intensity of a first transmitted signal transmitted from the AP; and changing intensity of a second transmitted signal transmitted to the external electronic device, based on the intensity of the first transmitted signal.

2. The electronic device of claim 1, wherein the instructions, when executed by the processor, cause the electronic device to:
receive a first signal commanding to change a channel of the Wi-Fi link from the first channel to a second channel from the AP;
change the channel of the Wi-Fi link from the first channel to the second channel, based at least on the first signal; and
change a channel of the mobile hotspot link from the first channel and the second channel.

3. The electronic device of claim 2, wherein the instructions, when executed by the processor, cause the electronic device to:
identify whether the first channel is a dynamic frequency selection (DFS) channel, and
in response to identifying that the first channel is DFS channel, change the channel of the Wi-Fi link from the first channel to the second channel, and change the channel of the mobile hotspot link from the first channel and the second channel.

4. The electronic device of claim 3, wherein the first signal includes information about a timer, and
wherein the instructions, when executed by the processor, cause the electronic device to:
in response to identifying that the first channel is non-DFS channel, start the timer based at least on the information about the timer; and
change the channel of the Wi-Fi link and the mobile hotspot link from the first channel to the second channel, while the timer is running.

5. The electronic device of claim 4, wherein the instructions, when executed by the processor, cause the electronic device to:
disconnect the Wi-Fi link, when the timer expires before changing the channel of the Wi-Fi link and the mobile hotspot link from the first channel to the second channel; and
disconnect the mobile hotspot link.

6. The electronic device of claim 5, wherein the instructions, when executed by the processor, cause the electronic device to:
transmit, to the external electronic device, a second signal commanding to change the channel of the mobile hotspot link from the first channel to the second channel; and
change the channel of the mobile hotspot link from the first channel to the second channel based at least on the second signal.

7. The electronic device of claim 1, wherein the instructions, when executed by the processor, cause the electronic device to:
detect that there is a change in location of the electronic device, after changing the intensity of the second transmitted signal;

measure the intensity of the first transmitted signal; and
change the intensity of the second transmitted signal, based on the intensity of the first transmitted signal.

8. A method of an electronic device equipped with a Wi-Fi module including one core, the method comprising: establishing a Wi-Fi link on a first channel with an AP, through the Wi-Fi module; establishing a mobile hotspot link on the first channel with an external electronic device, through the Wi-Fi module; detecting an event associated with a change in state of the WiFi link; and changing a state of the mobile hotspot link, based at least on the detected event, wherein the detecting of the event associated with the change in the state of the WiFi link includes: detecting that the first channel is an indoor-only channel capable of being permitted only indoors, and wherein the changing of the state of the mobile hotspot link includes: measuring intensity of a first transmitted signal transmitted from the AP; and changing intensity of a second transmitted signal transmitted to the external electronic device, based on the intensity of the first transmitted signal.

9. The method of claim 8, further comprising:
receiving a first signal commanding to change a channel of the Wi-Fi link from the first channel to a second channel from the AP;
changing the channel of the Wi-Fi link from the first channel to the second channel, based at least on the first signal; and
changing a channel of the mobile hotspot link from the first channel to the second channel.

10. The method of claim 9, wherein the first signal includes information about a timer,
the method further comprising:
identifying whether the first channel is a dynamic frequency selection (DFS) channel;
in response to identifying that the first channel is DFS channel, changing the channel of the Wi-Fi link from the first channel to the second channel, and changing the channel of the mobile hotspot link from the first channel and the second channel;
in response to identifying that the first channel is non-DFS channel, starting the timer based at least on the information about the timer; and
changing the channel of the Wi-Fi link and the mobile hotspot link from the first channel to the second channel, while the timer is running.

11. The method of claim 10, further comprising:
disconnecting the Wi-Fi link, when the timer expires before changing the channel of the Wi-Fi link and the mobile hotspot link from the first channel to the second channel; and
disconnecting the mobile hotspot link.

12. The method of claim 11, wherein the changing of the channel of the mobile hotspot link from the first channel to the second channel further includes:
transmitting, to the external electronic device, a second signal commanding to change the channel of the mobile hotspot link from the first channel to the second channel.

13. The method of claim 8, further comprising:
detecting that there is a change in location of the electronic device, after changing the intensity of the second transmitted signal;
measuring the intensity of the first transmitted signal; and
changing the intensity of the second transmitted signal, based on the intensity of the first transmitted signal.

* * * * *